Figure 1:
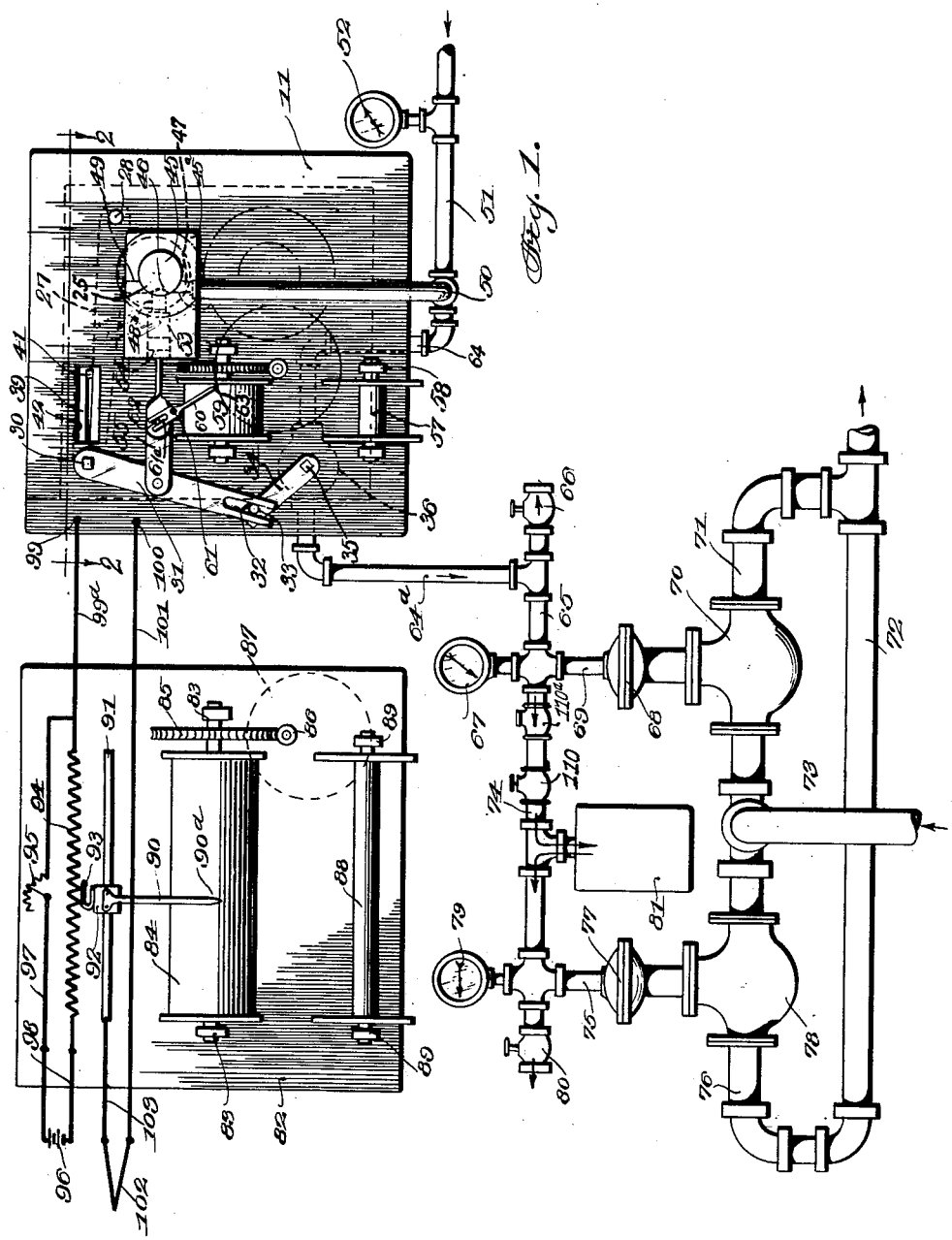

Jan. 5, 1932.  M. H. TUTTLE  1,839,425
TEMPERATURE CONTROL
Filed Aug. 4, 1928  5 Sheets-Sheet 1

INVENTOR
M. H. Tuttle
BY
ATTORNEY

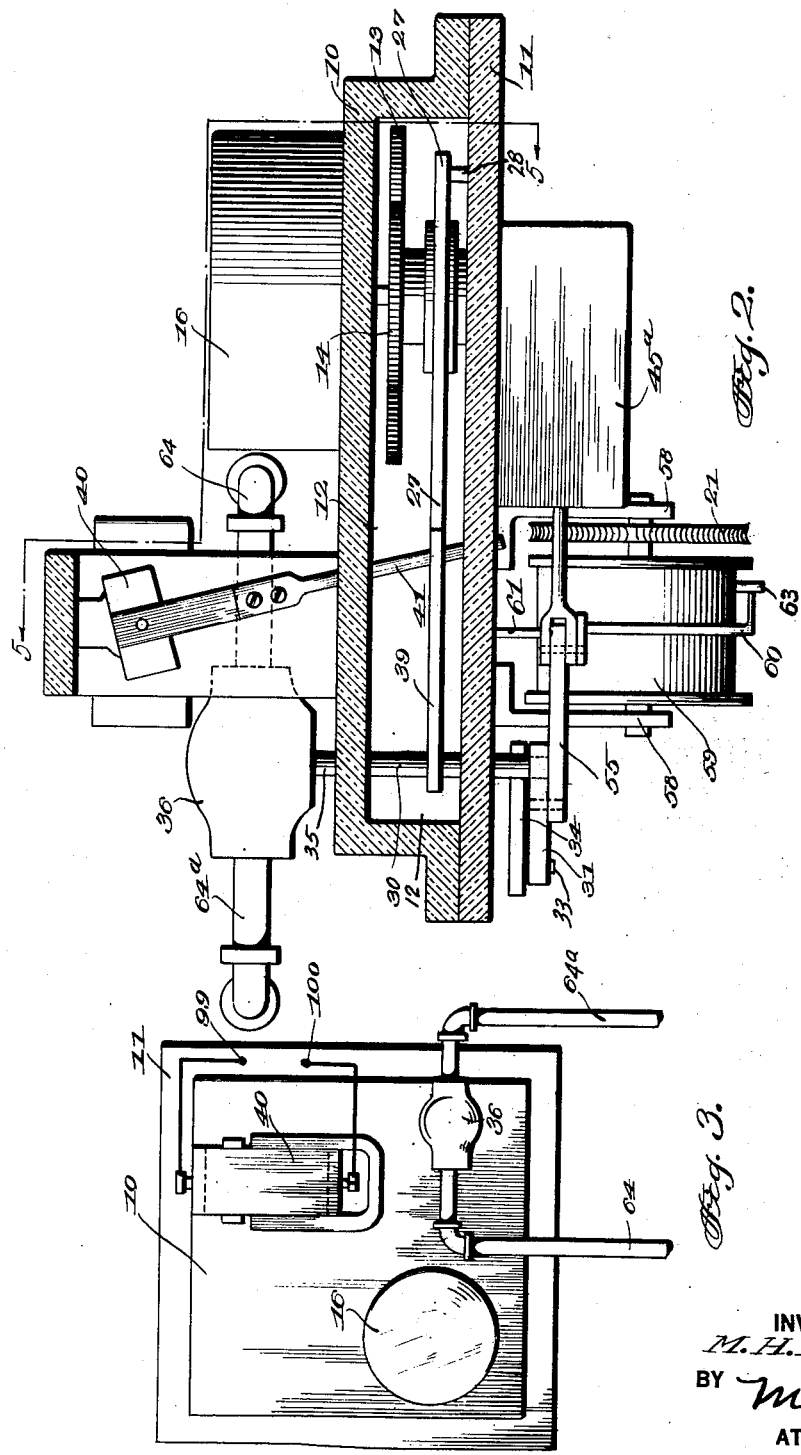

Jan. 5, 1932.  M. H. TUTTLE  1,839,425
TEMPERATURE CONTROL
Filed Aug. 4, 1928  5 Sheets-Sheet 3
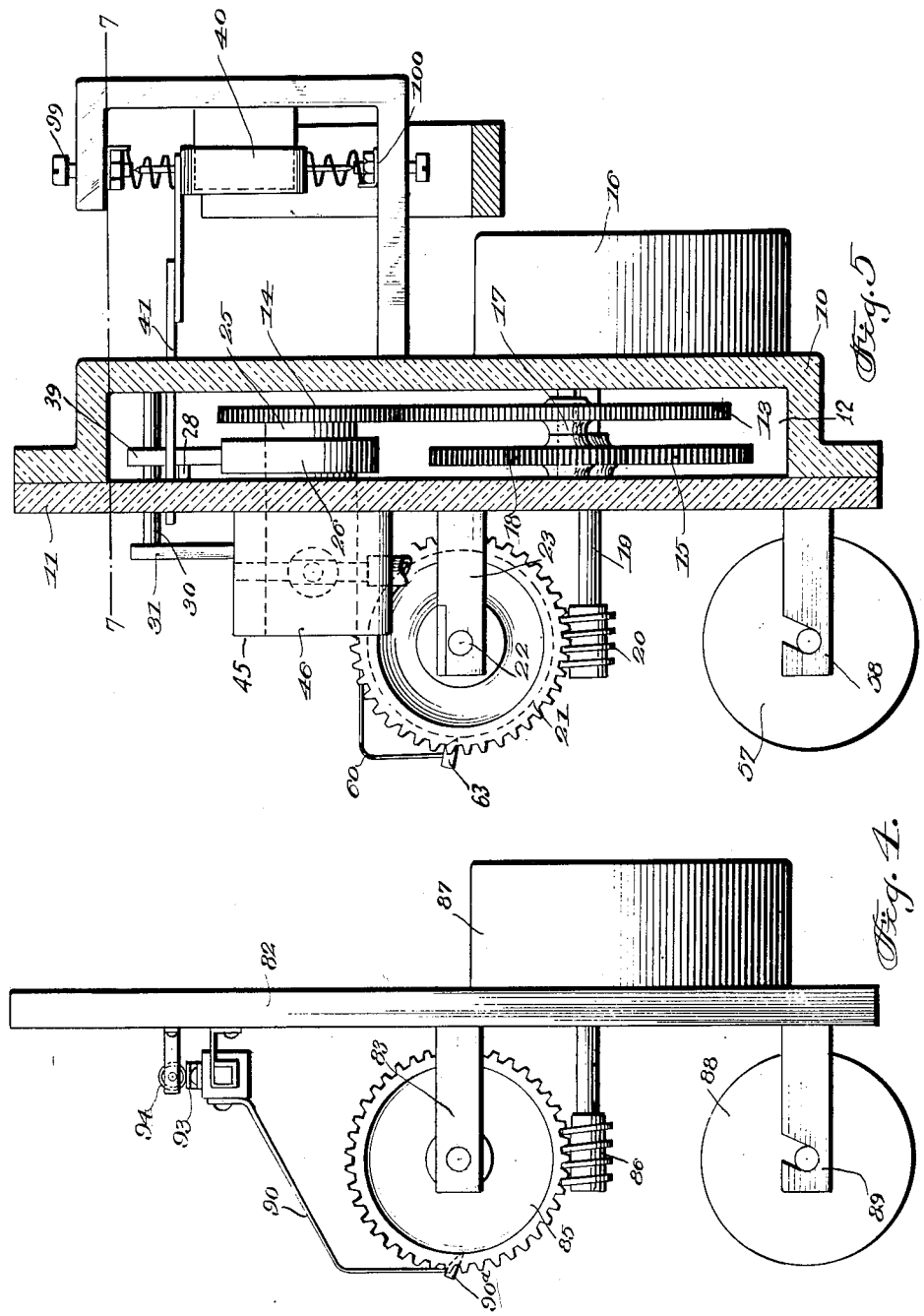
INVENTOR
M. H. Tuttle
BY
ATTORNEY Jan. 5, 1932.  M. H. TUTTLE  1,839,425
TEMPERATURE CONTROL
Filed Aug. 4, 1928  5 Sheets-Sheet 4
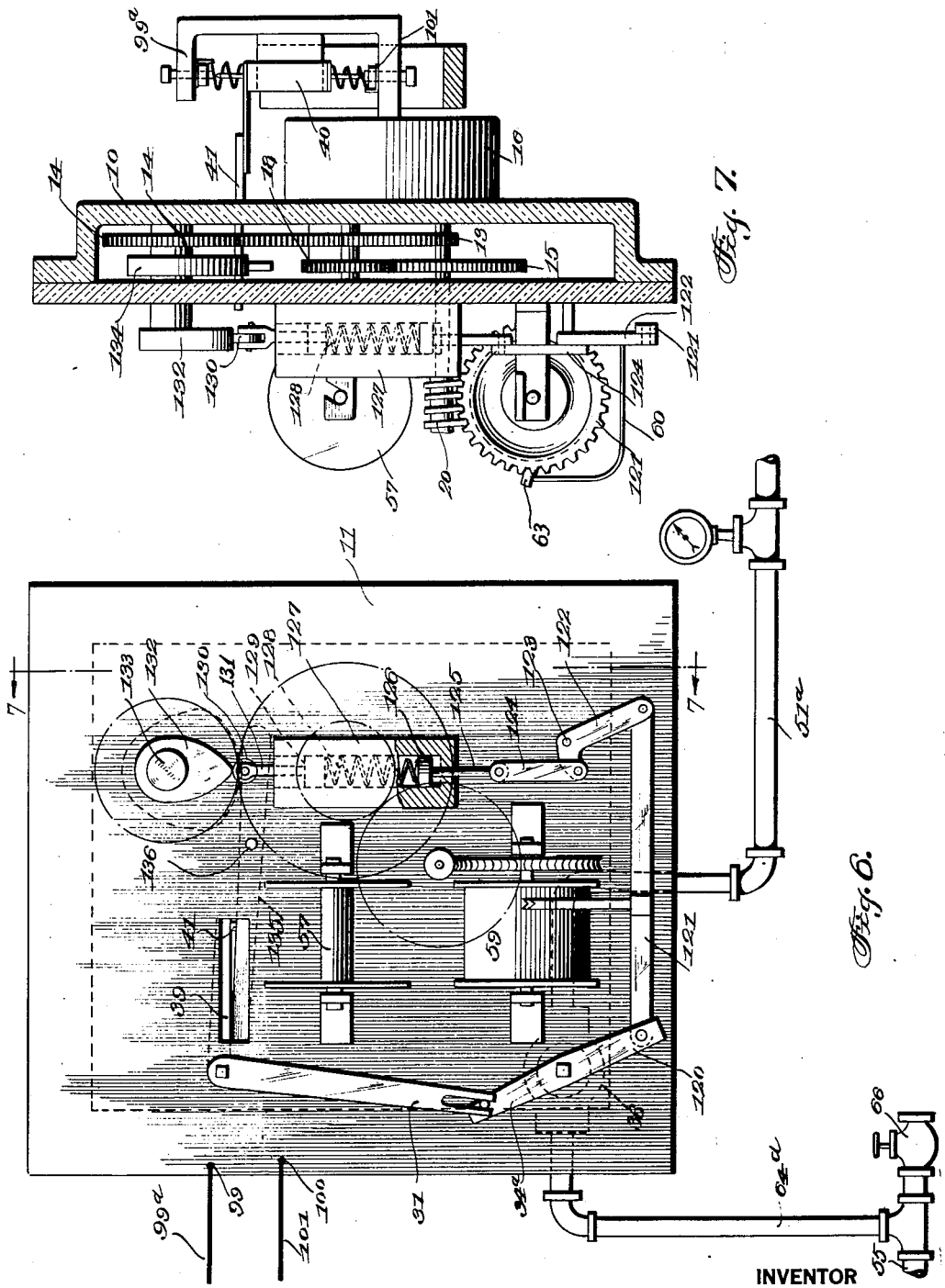
INVENTOR
M. H. Tuttle
BY
ATTORNEY Jan. 5, 1932.    M. H. TUTTLE    1,839,425
TEMPERATURE CONTROL
Filed Aug. 4, 1928    5 Sheets-Sheet 5

INVENTOR
M. H. Tuttle
BY
ATTORNEY

Patented Jan. 5, 1932

1,839,425

UNITED STATES PATENT OFFICE

MALCOLM H. TUTTLE, OF NEW ORLEANS, LOUISIANA

TEMPERATURE CONTROL

Application filed August 4, 1928. Serial No. 297,549.

This invention relates to control apparatus for automatically regulating a condition such as temperature, rate of flow, pressure, etc.

An object of this invention is a simple, reliable and efficient apparatus which will quickly correct any variation in the value of the condition to be regulated and will maintain the condition at the desired value.

In an apparatus embodying the invention any change in the value of the condition is corrected through the operation of fluid actuated valves controlling the flow of a fluid, the rate of flow of which determines the value of the condition. These valves are actuated by a fluid system which in turn is controlled by a valve operated in response to changes in the value of the condition to be controlled. Means are also provided for recording the value of the condition to be maintained and to record the operation of the control valve for the fluid system. The fluid system is so arranged that the valves respond not only to fluctuations in pressure in the fluid system, but are also governed by the average pressure thereof so that accurate regulation is obtained.

In one embodiment of the invention temperature control is effected by supplying to a heated body cooling fluid, the rate of flow of which is regulated in response to variations in the position of a galvanometer needle, the actuation of which is controlled by a thermo-couple. A pilot valve controls the flow in the fluid system thereby controlling the pressure applied to the fluid actuated valves and the pilot valve is actuated in accordance with the position assumed by the galvanometer needle. Means are provided for setting the apparatus for different temperatures and means are provided to record the temperature for which the apparatus is set. Such an apparatus will effectively control temperature within a variation of two or three degrees over a very wide range.

This invention will be best understood from a consideration of the following detailed description, in connection with the accompanying drawings; nevertheless, it is to be understood that the invention is not confined to the disclosure but is susceptible of such changes and modifications as shall define no material departure from the salient features of the invention as expressed in the appended claims.

In the drawings:—

Figure 9:
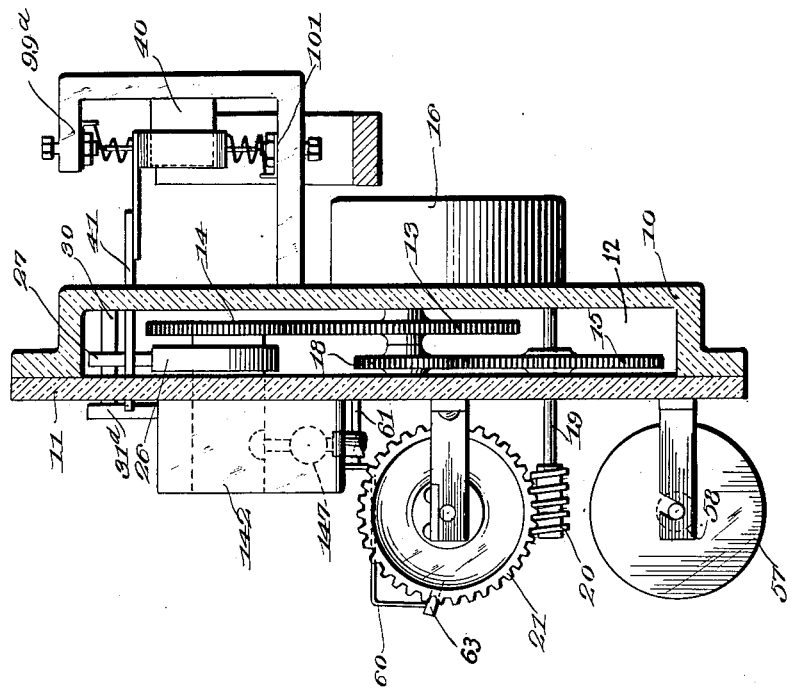
Figure 8:
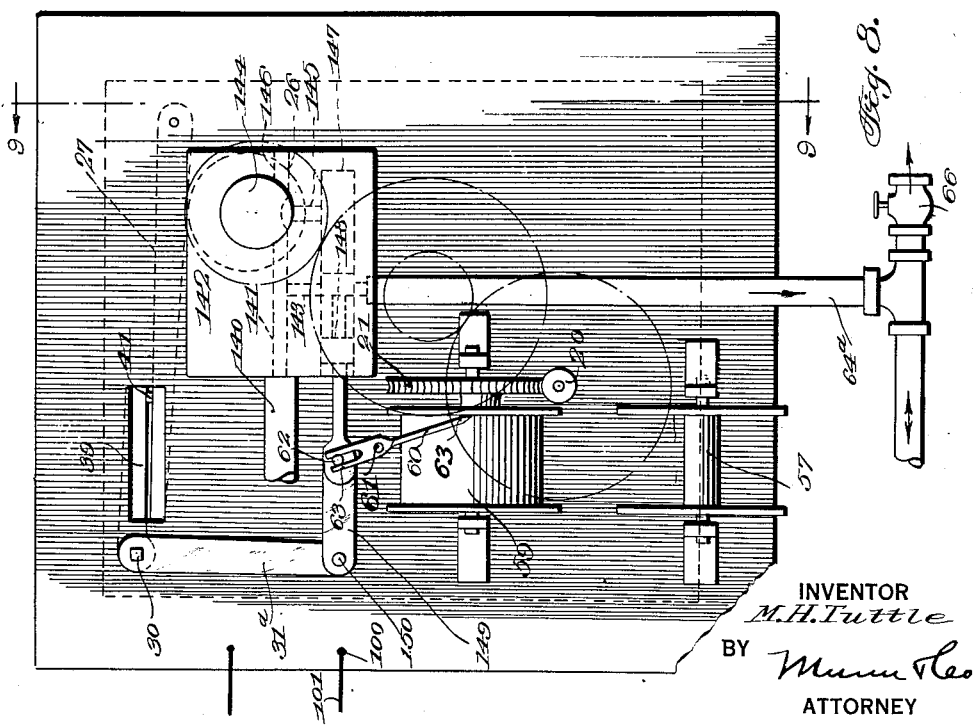

Figure 1 shows more or less diagrammatically a view in elevation of a device constructed according to the principles of my invention, Figure 2 is a horizontal section taken along the line 2—2 of Fig. 1, Figure 3 is a rear view in elevation of the device shown in Fig. 2, Figure 4 is an end view of one portion of the device, Figure 5 is a vertical section taken along the line 5—5 of Fig. 2, Figure 6 is a view in elevation of a modified form of the construction, Figure 7 is a vertical section taken along the line 7—7 of Fig. 6, Figure 8 is a further modified form of the device shown in Figs. 1 to 7 inclusive, Figure 9 is a vertical section taken along the line 9—9 of Fig. 8.

Referring more particularly to the drawings, 10 designates a housing having a cover plate 11 and a chamber 12 in which is mounted a series of gears 13, 14, and 15, driven by a motor 16, which may be of any approved type connected to the housing 10. The motor drives a shaft 17 to which is rigidly connected the gear 13, while a gear 18 rigid with the shaft 17 drives the gear 15 secured to a shaft 19. The shaft 19 projects through the cover 11 and has connected therewith a worm 20 in mesh with a worm gear 21 driving a shaft 22 mounted in bearings and brackets 23 projecting from the cover 11.

The gear 14 is fixed to a shaft 25 which carries a cam member 26 arranged to underlie a lever 27 pivotally supported by a stud 28. A shaft 30 is mounted in the cover 11 and housing 10, and is rigid with a lever 31 having a slot 32 to receive a pin 33 on the end of a lever 34. This lever is rigid with a shaft 35 which causes rotation of a valve in a casing 36 so that rocking of the lever will rock the valve for a purpose which will be presently explained. The lever 39 is rigid with the shaft 30 and projects inwardly and over the lever 27. A galvanometer generally indicated by the numeral 40, has a needle 41 movable through a slot in the housing 10 and the cover 11, as shown at 42, and is adapted to be moved at times between the levers 39 and 27.

One end of the shaft 25 extends into a casing 45 attached to the cover 11 and having ports 47, 48 and 49. The shaft 25 is provided with a cut-out portion 46 which is adapted in one position to connect ports 47 and 48 and in another position to connect ports 48 and 49. The port 47 is in communication with an air pipe 50, the pipe 50 being in communication with an air supply pipe 51, provided with an air pressure gauge 52. The port 48 communicates with a cylinder 53 in which a piston 54 is adapted to operate. The piston is connected by means of a rod 55 to the lever 31. The port 49 communicates with the atmosphere. When the ports 47 and 48 are in communication air is supplied from the pipe 50 to the cylinder 53 and when the ports 48 and 49 are in communication air is exhausted from the cylinder 53 into the atmosphere.

A reel 57 supported by brackets 58 is adapted to carry a ribbon chart which is wound upon a reel 59 mounted on shaft 22 driven by means of the gear 21. A lever 60 pivoted intermediate its ends at 61, is adapted to be oscillated by a pin 62 on the rod 55 and working in a slot 61a in the lever. The opposite end of the lever, as shown at 63, carries the pencil or pen for describing diagrams on the chart.

The pipe 51 has a branch pipe 64 in communication with the valve casing 36, and the branch pipe 64a connects the valve casing with a pipe 65. The valve 66 is provided in the end of the pipe 65 to permit a regulated quantity of air to be exhausted from said pipe. A pressure gauge 67 is included in the pipe 65 and a diaphragm, indicated at 68, is interpolated in a branch pipe 69, extending from the pipe 65. This diaphragm controls a valve in a casing 70 located in one branch pipe 71 of a discharge pipe 72. A pipe 73 is in communication with the branch pipe 71 and is adapted to supply fluid thereto.

A pipe line 74 communicates with the pipe 65 and a pipe 75 in which is interpolated a diaphragm 77 adapted to control a valve 78 contained in the branch line 76 connecting the supply pipe 73 with the discharge pipe 72. A pressure gauge 79 communicates with the pipe line 74 and a valve 80 is provided for controlling the discharge of a regulated quantity of air from branch line 74 into the atmosphere. A storage tank 81 communicates with the branch line 74 and in the branch line there is provided a control valve 110 and a check valve 110a which prevents flow from the pipe 74 into the line 65.

A base board 82 carries brackets 83 for a spool 84, which is revolved by means of a worm gear 85, a worm 86, and a motor 87 of any approved construction. An unwinding spool 88 is mounted in brackets 89 carried by the base member 82 in order to carry the tape 70 provided with a chart which is wound upon the reel 84.

An arm 90 mounted for sliding movement on a bar 91 by means of a cross head 92, carries a contact 93 adapted to be moved over a resistance 94. A rheostat 95 is connected in circuit with the resistance 94 and a source of current 96, by means of wires 97 and 98. A wire 99a connects the resistance 94 with a binding post 99 of the galvanometer 40. A binding post 100 of the galvanometer is connected by means of a wire 101 with one terminal with the thermo-couple 102. A wire 103 connects the other terminal of the thermocouple with the bar 91 so that the circuit from the source 96 is closed to the galvanometer through the wires 101, the bar 91 and the wire 99.

The temperature of an enclosure is automatically regulated by the above described device as follows: Heat is supplied to the enclosure by any suitable means (not shown) and a cooling medium is supplied to the enclosure by means of a pipe 72 in regulated quantity to maintain the desired temperature. Should the temperature in the enclosure increase, a greater supply of cooling medium will be delivered through the pipe 72 and should the temperature decrease the supply of cooling medium is correspondingly decreased. The amount of cooling medium flowing through the pipe 72 depends upon the setting of the valves 70 and 78 and the setting of these valves depends upon the flow of air through the valve 36 and the setting of the valve 36 depends upon the position of the needle 41 which is controlled by the thermocouple 102 arranged in the enclosure, the temperature of which is to be controlled.

The branch line 76 supplies the major portion of the cooling medium while the branch line 71 supplies the remaining portion. The valves 70 and 78 are fully open when the diaphragms 68 and 77 are subjected to zero pressure and increase of pressure on the diaphragms tends to close the valves. The diaphragm 77 is of such design that a relatively small pressure change, for example, a change of 2 pounds, say from 10 to 12 pounds, effects complete closure of the valve, while the diaphragm 68 is of such design that much larger pressure change, for example, 25 pounds, say from zero to 25 pounds is required to close the valve 70. The branch line 76 supplies cooling medium at a rate governed by the average pressure in the pipe line 65, while the branch line 71 supplies cooling medium at a rate changing with fluctuations of pressure in the pipe line 65. The valve 70 is therefore actuated to correct for slight temperature variations while the valve 78 is actuated to correct for large temperature variations.

Initially both diaphragms are subjected to zero pressure and the valves 70 and 78 are open. Initial flow of air through the pipe 64a at a greater rate than the rate of leakage through valves 66 and 80 produces pressure on the diaphragms 68 and 77, tending to move valves 70 and 78 toward closed position, and to store up a supply of air under pressure in the reservoir 81. This causes reduction in the flow of cooling medium, thereby resulting in change in position of the valve 36 to decrease the flow through pipe 64a. When the air flow through the pipe 64a decreases to such extent that leakage results in the pressure in the pipe 65 being less than the pressure in the pipe line 74, the check valve 110a closes to prevent flow from the pipe line 74 into the pipe 65 and the pressure in the reservoir 81 and on the diaphragm 77 is maintained except for leakage through the valve 80. The reservoir 81 preferably is of such size that leakage through the valve 80 results in a very slow decrease of pressure applied to the diaphragm 77. Reduction of pressure applied to the diaphragms causes the valves 70 and 78 to tend to open and increase the supply of cooling medium which results in change of position of valve 36 to increase air flow through pipe 64a. When the pressure in the pipe 65 again exceeds the pressure in the reservoir 81, air will again flow through the check valve 110a from the pipe 65 to the pipe line 74. When the flow through the check valve 110a is more rapid than leakage through the valve 80, the pressure in the reservoir 81 and on the diaphragm 77 will increase. In this way, the valves are automatically adjusted to supply the required volume of cooling medium.

The valve 36 is periodically set in the following manner:

The needle 41 is normally free for oscillation under the influence of current flowing through the galvanometer. Upon each rotation of a shaft 25, the cam 26 raises the lever 27 into the position shown in Fig. 1, thereby lifting the needle 41 toward or into engagement with the lever 39. At approximately the same time, air is admitted to the cylinder 53 through port 47, cut-out 46 and port 48, thereby exerting pressure on the piston 54 tending to move it, together with the rod 55 and lever 31 to the left in Fig. 1, to rotate the lever 39 into contact with the needle 41, if the lever is not already in contact with the needle. Further rotation of the shaft 25 puts the cylinder 63 into communication with the atmosphere to allow the air to escape therefrom, the lever 27 still being held in its raised position. Still further rotation of the shaft 25 brings the low portion of the cam 26 into contact with the lever 27, thereby permitting it to drop away from the needle 41 which is now again free to move under the influence of current flowing through the galvanometer 40. Whether or not the needle changes position depends upon whether or not there has been any change of temperature in the enclosure and consequently any change in the resistance of the thermo-couple 102. The lever 27 and the lever 39 are so arranged that when the lever 27 is raised, the two levers define a tapering slot and, as the position of the lever 27 is fixed, the position assumed by the lever 39 will depend upon the position of the needle 41, thereby determining the setting of the valve 36.

It is to be understood that by either reversing the action of the pilot valve 36, or by the use of reverse acting diaphragms 68 and 77, the heating medium, or source of heat may be furnished through the pipe 73 and delivered by the pipes 71 and 72 to the hot body, an example of which will include gas or fuel to be supplied to a furnace and thus the temperature of the heated body may be controlled.

In order to furnish a continuous record of the variations of the temperature from that for which the control is set, a roll or strip chart is employed in which the roll is mounted on spool 57 and driven by spool 59, through the gears previously described. The record is made by pen 64 which is actuated by the rod 55. These parts may be so proportioned that deviations may be shown in degrees.

A constant electro-motive source is supplied by the battery 96. The means for checking the potentials is ordinarily furnished in the manufactured instrument by standard cells, but since this checking mechanism is not essential to the operation it has not been disclosed. The thermo-couple may be at any point in series with the slide 91, and the galvanometer connection 100. As the slide 92, with the contact 93 is moved to the right, the galvanometer needle 41 is deflected to the left, causing the pilot valve to open so that the pressure on the diaphragm valves is increased, causing them to move to their closed position, thereby decreasing the flow of cooling medium, and resulting in a rise in temperature. The slide wire resistance may be so constructed that a unit distance on the slide wire will correspond to a unit change in the temperature at which the controller will function. Therefore, the chart which is carried by spool 88 and driven by spool 84 may be ruled with uniform spacing and record by means of the pen 90a, the temperature for which the controller is set. This temperature, plus the deviation shown by the controller rod indicates the exact temperature of the hot body. The arrangement, as shown, is for the purpose of controlling the temperature of a hot body by the addition of a cooling medium.

In the modified form shown in Figs. 6 and 7, the results obtained are similar to those in Figs. 1 to 5, inclusive. In the modified form the lever 34a has an extension 120 which is connected by means of a link 121 with a bell crank 122 pivoted at 123 on the cover 11 for the housing 10. A link 124 connects one end of the lever 122 with a piston rod 125 rigidly connected with the piston 126 mounted for reciprocation within a cylinder 127 carried by the cover 11. A spring 128 tends to force the piston 126 downwardly while forcing a piston 129 at the upper end of the cylinder 127 outwardly and forcing a roller 130, carried by a piston rod 131 into engagement with a cam 132, which is revolved by a shaft 133. A cam 134 engages the lever 135 pivoted at 136 on the cover 11. The air supply pipe 51a is directly connected with the valve 36 in the pipe 64a.

The operation of this form is controlled by the oscillation of the lever 135 through the cam 134 driven by the motor 16. As the outer free end of the lever is depressed by the cam, it is elevated and the galvanometer needle 41 has been moved to the left where it can be engaged by the lever 39, the upward movement of the left hand end of the lever 135 will move the lever 39 upwardly and thereby oscillate levers 31 and 34a. The downward movement of the piston 129 against the action of the spring 128 will tend to force the piston 126 downwardly and operate the valve 36. The true condition is that the lever 39, may be in any position as governed by the position of the galvanometer needle and as long as there is no change in temperature the position of 39, will be uneffected and the movement of lever 39, and the resulting operation of the control valve may be by very small amounts depending on the rate of temperature change and it is only in the case of extreme rates of change in temperature that the galvanometer would be deflected to either extreme positions.

The arrangement shown in Figs. 8 and 9 gives the identical results obtained in Figs. 1 to 7 inclusive. In this instance no rockable valve is shown in the casing 36, but a pipe 140 is the main air supply which is connected by means of a passage 141 in the valve casing 142 with an air channel 143. The channel 141 extends to the valve 144 and the air from passage 141 enters passage 145 when the cut out portion 146 of the valve 144 alines with the passages 141 and 145 so that air is admitted to the cylinder 147. The pipe 64a leads to a similar arrangement of the fluid control shown in the lower portion of Fig. 1. A piston 148 slidably mounted in the cylinder 147, is adapted to operate a rod 149 pivotally connected at 150 with the lever 31a which is rigid with the shaft 30 and adapted to be operated at times by a lever 39, through the galvanometer needle 41, and the lever 27. The cam 26 actuates the lever 27, which will raise the lever 29 when lever 27 is able to force the galvanometer needle 41 into engagement with the lever 39. The piston 148 uncovers the air supply port 143 with a drop in temperature, and a movement of the galvanometer needle to the left. It will be seen that while the piston 148 controls the air port 143 between the pipes 140 and 64a, the valve 144 controls the passage of the air from the pipe 140 to the cylinder 147 for controlling the position of the piston 148 and the cylinder, and with a consequent operation of the levers 31 and 39. When the galvanometer needle 41 has been moved away from the lever 39 and to the right, in Fig. 8, at a rise in temperature, the piston 148 will be able to move outwardly, actuating lever 31a and consequently lowering the position of lever 39 so that the periodic upward movement of the lever 27 will not effect the position of the lever 39 and this only happens when the galvanometer needle 41 has been moved to the right.

The position of the galvanometer needle 41 will determine the extent of the opening of the pilot valve 36, since the position of the galvanometer needle along the lever 27 will vary the throw or the angular movement of the lever 39.

I claim:—

1. In a device of the character described, a deflectable needle, means periodically to engage said needle to move the same, while preventing deflection thereof, in a direction perpendicular to its plane of deflection and hold it temporarily against return movement, a member movable toward and away from said plane of deflection, and means for temporarily applying to said member, while said needle is held against return movement, force in a direction tending to effect contact of said member with said needle, the relation between said member and needle being such that each movement of said member corresponds in direction and is of predetermined ratio to the net deflection of the needle during the period directly preceding the engagement of the needle by said first-named means.

2. In a device of the character described, a deflectable needle, a member periodically movable to engage said needle to move the same while preventing deflection thereof, in a direction normal to its plane of deflection and hold it temporarily against return movement, a second member movable toward and away from said plane of deflection, and means for temporarily applying to said second member, while said needle is held against return movement, force in a direction tending to effect contact of said second member with said needle, said members having opposing relatively oblique faces whereby each movement of said second member corresponds in direction and is of predetermined ratio to the net deflection of the needle during the period directly preceding the engagement of the needle by said first member.

3. In a device of the character described, a deflectable needle, a pair of pivoted levers embracing said needle, means for periodically bringing one of said levers into engagement with said needle to move the same, while preventing deflection thereof, in a direction normal to its plane of deflection and hold it temporarily against return movement, means for temporarily applying to said second lever, while said needle is held against return movement, force in a direction tending to effect contact of said second lever with said needle, the relation between said levers and needle being such that each movement of said second lever corresponds in direction and is of predetermined ratio to the net deflection of the needle during the period directly preceding the engagement of said needle by said first lever.

4. In a device of the character described, a deflectable needle, a pair of pivoted levers embracing said needle, means for periodically bringing one of said levers into engagement with said needle to move it, while preventing deflection thereof, in a direction normal to its plane of deflection and hold it temporarily against return movement, and means for temporarily applying to said second lever, while said needle is held against return movement, force in a direction tending to effect contact of said second lever with said needle, said levers having opposed relatively oblique faces whereby each movement of said second lever corresponds in direction and is of predetermined ratio to the net deflection of the needle during the period directly preceding the engagement of the needle by said first lever.

5. In a device of the character described, a deflectable needle, a pair of movable members embracing said needle, means for periodically moving one of said members into engagement with said needle to move it, while preventing deflection thereof, in a direction normal to its plane of deflection and hold it temporarily against return movement, means for temporarily applying to said second member while said needle is held against return movement, force in a direction tending to effect contact of said second member with said needle, the relation between said members and needle being such that each movement of said second member corresponds in direction and is of predetermined ratio to the net deflection of the needle during the period directly preceding the engagement of the needle by said first-named means.

6. In a device of the character described, a deflectable needle, a pair of movable members embracing said needle, means periodically to move one of said members into engagement with said needle to move it, while preventing deflection thereof in a direction normal to its plane of deflection and hold it temporarily against return movement, means for temporarily applying to said second member, while said needle is held against return movement, force in a direction tending to effect contact of said second member with said needle, said members having relatively oblique opposing faces whereby each movement of said second member corresponds in direction and is of predetermined ratio to the net deflection of the needle during the period directly preceding the engagement of the needle by said first member.

7. In a device of the character described, a deflectable needle, a pair of movable members embracing said needle, means for periodically moving one of said members into engagement with said needle to move the same, while preventing deflection thereof, in a direction normal to its plane of deflection and hold it temporarily against return movement, means for temporarily applying to said second member, while said needle is held against return movement, force in a direction tending to effect contact of said second member with said needle, said members having opposed relatively oblique faces whereby each movement of said second member corresponds in direction and is of predetermined ratio to the net deflection of the needle during the period directly preceding engagement of the needle by said first member, a fluid system, and a pilot valve for said fluid system, said pilot valve being operatively connected to said second member.

8. In a device of the character described, a deflectable needle, means periodically to engage said needle to move the same, while preventing deflection thereof, in a direction perpendicular to its plane of deflection and hold it temporarily against return movement, a member movable toward and away from said plane of deflection, and means for temporarily applying to said member, while said needle is held against return movement, force in a direction tending to effect contact of said member with said needle, the relation between said member and needle being such that each movement of said member corresponds in direction and is of predetermined ratio to the net deflection of the needle during the period directly preceding the engagement of the needle by said first-named means, a fluid system, and a pilot valve for said fluid system, said pilot valve being operatively connected to said second member.

9. In a device of the character described, a deflectable needle, a member periodically movable to engage said needle to move the same, while preventing deflection thereof, in a direction normal to its plane of deflection and hold it temporarily against return movement, a second member movable toward and away from said plane of deflection, and means for temporarily applying to said second member, while said needle is held against return movement, force in a direction tending to effect contact of said second member with said needle, said members having opposing relatively oblique faces whereby each movement of said second member corresponds in direction and is of predetermined ratio to the net deflection of the needle during the period directly preceding the engagement of the needle by said first member, a fluid system, and a pilot valve for said fluid system, said pilot valve being operatively connected to said second member.

10. In a device of the character described, a deflectable needle, a pair of pivoted levers embracing said member, means for periodically bringing one of said levers into engagement with said needle to move the same, while preventing deflection thereof, in a direction normal to its plane of deflection and hold it temporarily against return movement, means for temporarily applying to said second lever, while said needle is held against return movement, force in a direction tending to effect contact of said second lever with said needle, the relation between said levers and needle being such that each movement of said second lever corresponds in direction and is of predetermined ratio to the net deflection of the needle during the period directly preceding the engagement of said needle by said first lever, a fluid system, and a pilot valve for said fluid system, said pilot valve being operatively connected to said second member.

11. In a device of the character described, a deflectable needle, a pair of pivoted levers embracing said needle, means for periodically bringing one of said levers into engagement with said needle to move it, while preventing deflection thereof, in a direction normal to its plane of deflection and hold it temporarily against return movement, and means for temporarily applying to said second lever, while said needle is held against return movement, force in a direction tending to effect contact of said second lever with said needle, said levers having opposed relatively oblique faces whereby each movement of said second lever corresponds in direction and is of predetermined ratio to the net deflection of the needle during the period directly preceding the engagement of the needle by said first lever, a fluid system, and a pilot valve for said fluid system, said pilot valve being operatively connected to said second member.

12. In a device of the character described, a deflectable needle, a pair of movable members embracing said needle, means periodically to move one of said members into engagement with said needle to move it, while preventing deflection thereof, in a direction normal to its plane of deflection and hold it temporarily against return movement, means for temporarily applying to said second member, while said needle is held against return movement, force in a direction tending to effect contact of said second member with said needle, said members having relatively oblique opposing faces whereby each movement of said second member corresponds in direction and is of predetermined ratio to the net deflection of the needle during the period directly preceding the engagement of the needle by said first member, a fluid system, and a pilot valve for said fluid system, said pilot valve being operatively connected to said second member.

13. In a fluid system, a supply line having a pair of channels, diaphragm operated valves for said channels, passages leading from said valves, a pipe connected to said passages, vents in said pipe ahead of and beyond the junctions of said passages and pipe, a reservoir communicating with said pipe between said junctions, a check valve for preventing flow from said reservoir to one of said passages, a pilot valve in said pipe, and automatic means for periodically setting said pilot valve.

14. In a fluid system, a supply line having a pair of channels, diaphragm operated valves for said channels, passages leading from said valves, a pipe connected to said passages, vents in said pipe ahead of and beyond the junctions of said passages and pipe, a reservoir communicating with said pipe between said junctions, a check valve for preventing flow from said reservoir to one of said passages, a pilot valve in said pipe, and temperature controlled means for periodically setting said pilot valve.

15. In a temperature control apparatus, a galvanometer having its needle deflectable in accordance with temperature changes, a fluid system for supplying fluid to effect temperature correction, a pilot valve for said system, means including said needle for periodically correcting the position of the pilot valve, means for recording the temperature on which the apparatus is set to function, and means for recording variations in the position of the pilot valve.

16. In a temperature control apparatus, a galvanometer having its needle deflectable in accordance with temperature changes, a system for supplying fluid to effect temperature correction, a pilot valve for said system, a movable member operatively connected to said pilot valve, means including said needle for periodically actuating said member, means for recording the temperature on which the apparatus is set to function, and means for recording variation in the position of said movable member.

MALCOLM H. TUTTLE.